(12) United States Patent
Schuellein

(10) Patent No.: US 7,573,245 B2
(45) Date of Patent: Aug. 11, 2009

(54) MULTI-PHASE CONVERTER WITH FREQUENCY AND PHASE TIMING CONTROL

(75) Inventor: George Schuellein, Narragansett, RI (US)

(73) Assignee: International Rectifier Corporation, El Segundo, CA (US)

( * ) Notice: Subject to any disclaimer, the term of this patent is extended or adjusted under 35 U.S.C. 154(b) by 276 days.

(21) Appl. No.: 11/761,727

(22) Filed: Jun. 12, 2007

(65) Prior Publication Data

US 2007/0291520 A1    Dec. 20, 2007

Related U.S. Application Data

(63) Continuation-in-part of application No. 11/530,957, filed on Sep. 12, 2006, now Pat. No. 7,492,136.

(60) Provisional application No. 60/814,850, filed on Jun. 19, 2006.

(51) Int. Cl.
*G05F 1/59* (2006.01)

(52) U.S. Cl. ............................ 323/272; 323/283; 363/65

(58) Field of Classification Search ................. 323/222, 323/224, 282–290, 272–274, 269; 363/89, 363/95, 97, 127, 131, 132, 21.15; 307/66, 307/65; 327/141

See application file for complete search history.

(56) References Cited

U.S. PATENT DOCUMENTS

| 4,814,965 | A | * | 3/1989 | Petersen | .................... | 363/65 |
| 5,638,264 | A | * | 6/1997 | Hayashi et al. | ............... | 363/65 |
| 5,805,453 | A | * | 9/1998 | Sasaki | ........................ | 700/128 |
| 5,870,296 | A | * | 2/1999 | Schaffer | ..................... | 363/65 |
| 6,346,798 | B1 | * | 2/2002 | Passoni et al. | .............. | 323/272 |

\* cited by examiner

*Primary Examiner*—Rajnikant B Patel
(74) *Attorney, Agent, or Firm*—Farjami & Farjami LLP

(57) ABSTRACT

A multi-phase converter comprising a plurality of switching circuits each controlled by a phase controller and each providing a switched output voltage to an output node of the converter and wherein each switching circuit under control of the phase controller sequentially provides a switched output voltage to the output node at which an output voltage of the converter is developed; and a main control circuit including a clock circuit for providing a first clock signal to each of the switching circuits and a second lower frequency clock signal to a first of the phase controllers, each phase controller having a delay circuit controlled by the first clock signal to provide a delayed second clock signal for coupling to a next one of the phase controllers and in the case of a last one of the phase controllers, back to the main control circuit, whereby a plurality of sequentially delayed second clock signals is provided, one to each of the remaining phase controllers after the first phase controller to determine when each switching circuit provides the switched output voltage to the output node.

11 Claims, 9 Drawing Sheets

MULTI-PHASE CONVERTER WITH FREQUENCY AND PHASE TIMING CONTROL

CROSS-REFERENCE TO RELATED APPLICATIONS

This application claims the benefit and priority of U.S. Provisional Application Ser. No. 60/814,850 filed Jun. 19, 2006 entitled TWO WIRE SCHEME FOR SQUARE WAVE CLOCK FOR PROGRAMMING PHASE TIMING, the entire contents of which are incorporated by reference herein. This application is also a continuation-in-part of U.S. application Ser. No. 11/530,957 filed Sep. 12, 2006 entitled MULTI-PHASE CONVERTER WITH IMPROVED LOAD STEP-UP TRANSIENT RESPONSE.

BACKGROUND OF THE INVENTION

The present invention relates to DC to DC converters, and in particular, to multi-phase converters which produce a DC output voltage at the common output of a plurality of coupled switching power supplies, for example, a plurality of buck converters.

Multi-phase converters are known. In a typical multi-phase converter, for example, a multi-phase buck converter, a plurality of buck converters are provided each having their output inductors coupled to the output node. In a typical application, each buck converter is controlled by a control circuit and may be operated such that a control switch of each buck converter switching stage is turned on at a different time than the other phases. In this way, each phase sequentially provides power to the load, reducing ripple and reducing the size of the output capacitance.

When multi-phase converters are constructed, it is necessary to be able to control the frequency and phase of each of the output switching converters forming the multi-phase converter. In the past, this has been done by employing a single wire bus using an analog 50% duty cycle triangle wave. There were deficiencies in the previous implementation including the following.

(1) Two external resistors are required per phase to program the phase delay. These resistors cost money, require PCB area, increase PCB layout complexity, are a source of potential failure, and their values must be calculated increasing design complexity.

(2) The accuracy of analog programming of phase timing is degraded, there is non-ideal ramp linearity, component tolerance issues, and noise.

(3) Phases can not be programmed to go on near the peak and valley of the triangle wave leading to inherent phase timing errors in some systems.

It would be desirable to provide a multi-phase converter that solves these problems.

SUMMARY OF THE INVENTION

Accordingly, it is an object of the present invention to provide a multi-phase converter which provides a simple means for setting the frequency of operation and phase timing control of a plurality of phases of the multi-phase converter.

In accordance with the invention, a multi-phase converter is provided comprising a plurality of switching circuits each controlled by a phase controller and each providing a switched output voltage to an output node of the converter and wherein each switching circuit under control of the phase controller sequentially provides a switched output voltage to the output node at which an output voltage of the converter is developed; and a main control circuit including a clock circuit for providing a first clock signal to each of the phase controllers and a second lower frequency clock signal to a first of the phase controllers, each phase controller having a delay circuit controlled by the first clock signal to provide a delayed second clock signal for coupling to a next one of the phase controllers, and, in the case of a last one of the phase controllers, back to the main control circuit, whereby a plurality of sequentially delayed out of phase second clock signals is provided, one to each of the remaining phase controllers after the first phase controller to determine when each switching circuit provides the switched output voltage to the output node.

In a preferred implementation the delay circuits in the phase controllers are connected in a daisy chain arrangement such that the last phase controller provides a delayed second clock signal back to the main control circuit.

The invention, in one implementation, uses a two wire bus (plus ground) and a return line.

Other objects, features and advantages of the invention will be apparent from the detailed description which follows.

BRIEF DESCRIPTION OF THE DRAWING(S)

The invention will now be described in greater detail in the following detailed description with reference to the drawings in which.

DETAILED DESCRIPTION OF PREFERRED EMBODIMENTS OF THE INVENTION

Figure 1:
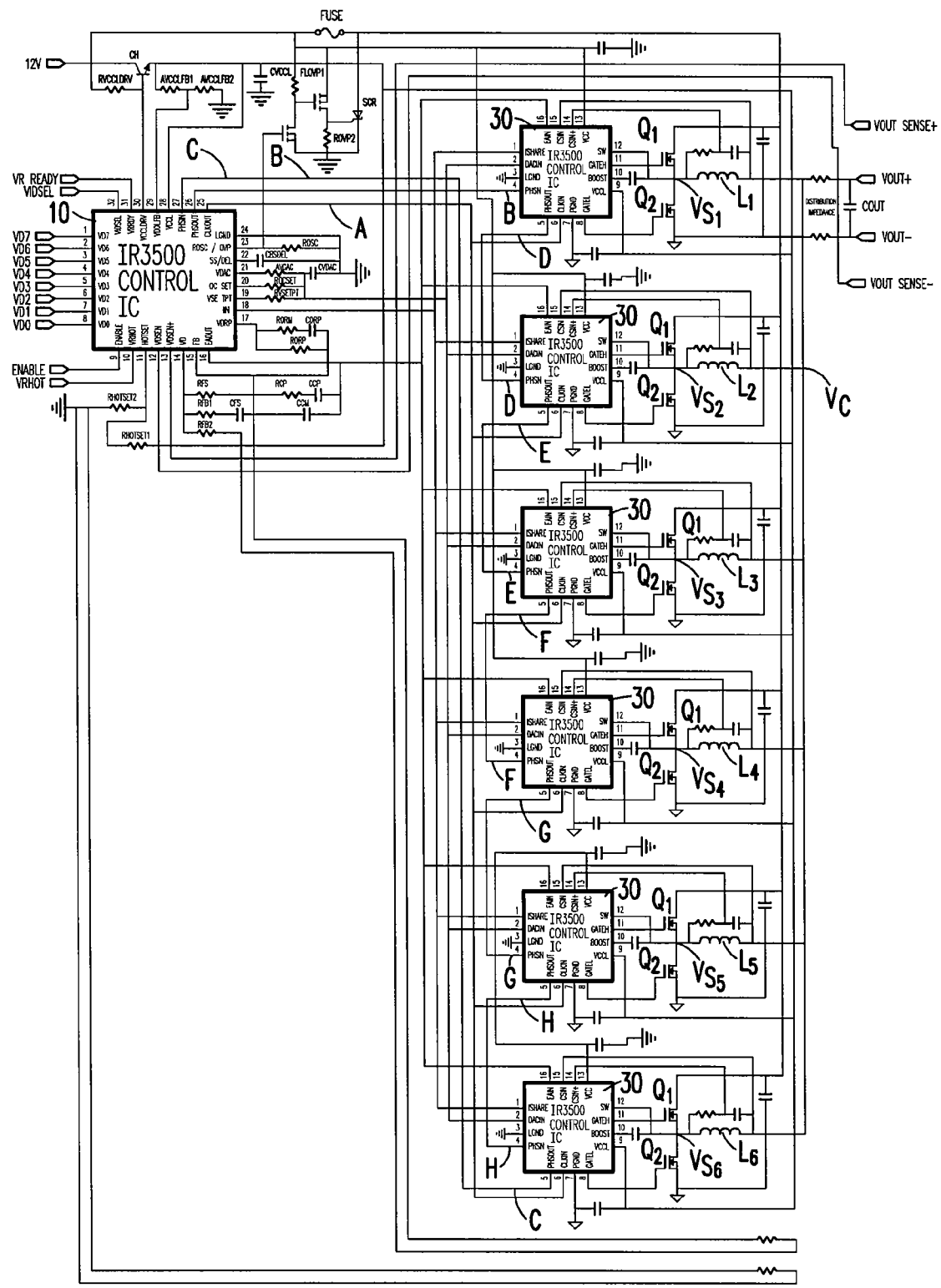
FIG. 1 shows a six-phase multi-phase converter to which the invention is applied.
Figure 2:
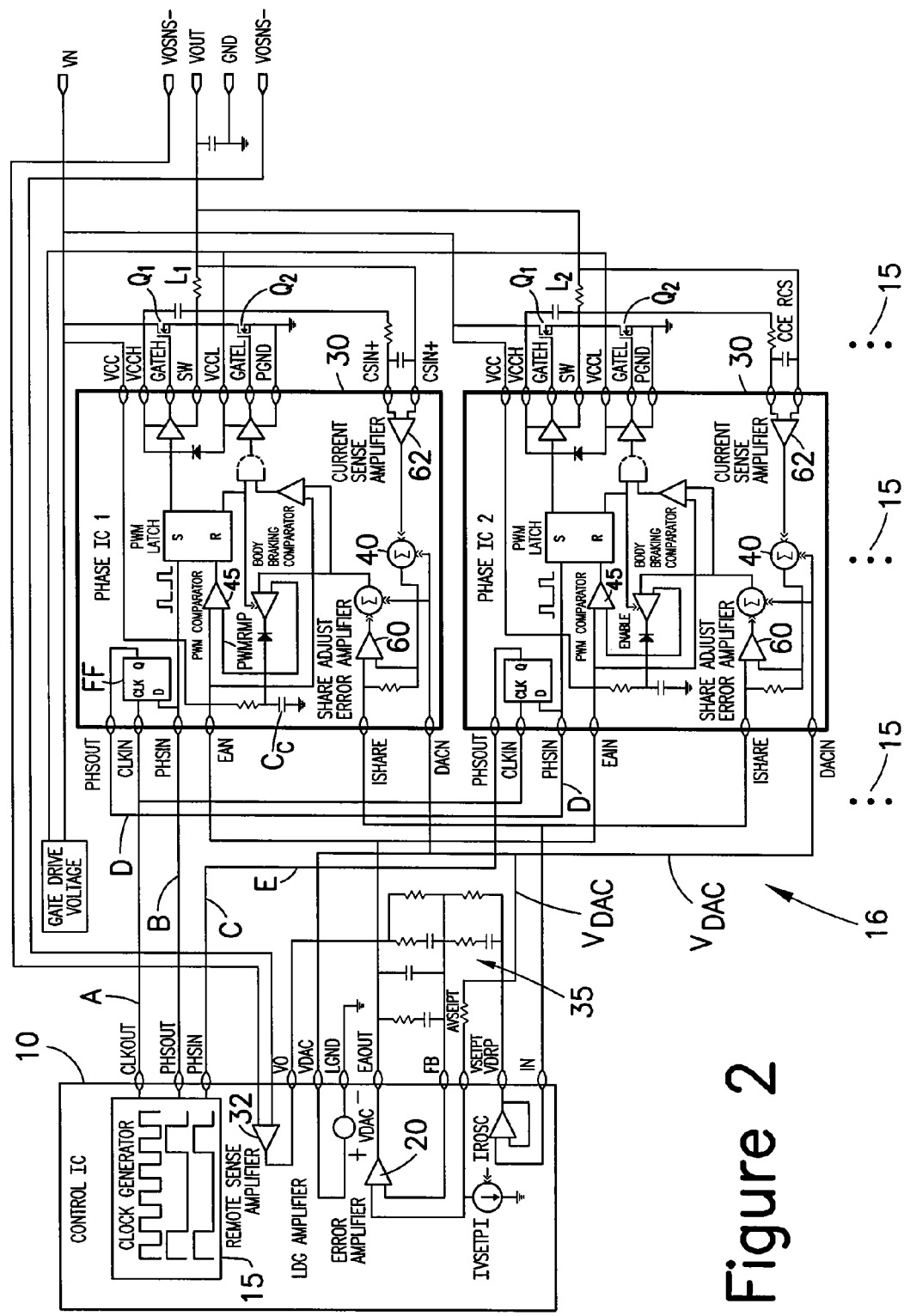
FIG. 2 shows in greater detail the multi-phase converter of FIG. 1 showing only two phases in detail.

With reference to the drawings, FIGS. 1 and 2 show a multi-phase converter implementing the invention. FIG. 2 shows greater details of the circuit of FIG. 1 only showing two phase controllers 30 (phase ICs) in detail, which are identical. Each phase IC 30 controls a buck converter (switching circuit) comprising two transistors Q1 and Q2 and an output inductor $L_N$. Transistor Q1 is the control switch and transistor Q2 is the synchronous switch. The synchronous switch can be replaced by a diode, as well known to those of skill in the art, although the use of a synchronous switch provides greater efficiency.

FIG. 1 shows an example of a six-phase multi-phase converter which employs the IR3500 control integrated circuit 10 and a plurality, in the six-phase case shown, six IR3505 phase ICs 30 which are controlled by the control IC. Each phase IC 30 is identical and has outputs connected to a respective buck converter comprising two switches, an upper switch Q1 functioning as the control switch and the lower switch Q2 functioning as a synchronous switch. The switch node $V_S$ 1-6 of each respective phase is connected to an output inductor L1 through L6 for each of the phases which are connected at a common node VC and coupled to an output node VOUT+ through any distribution impedance present. An output capacitor COUT is coupled across the output to filter the switched output voltage.

Figure 3:
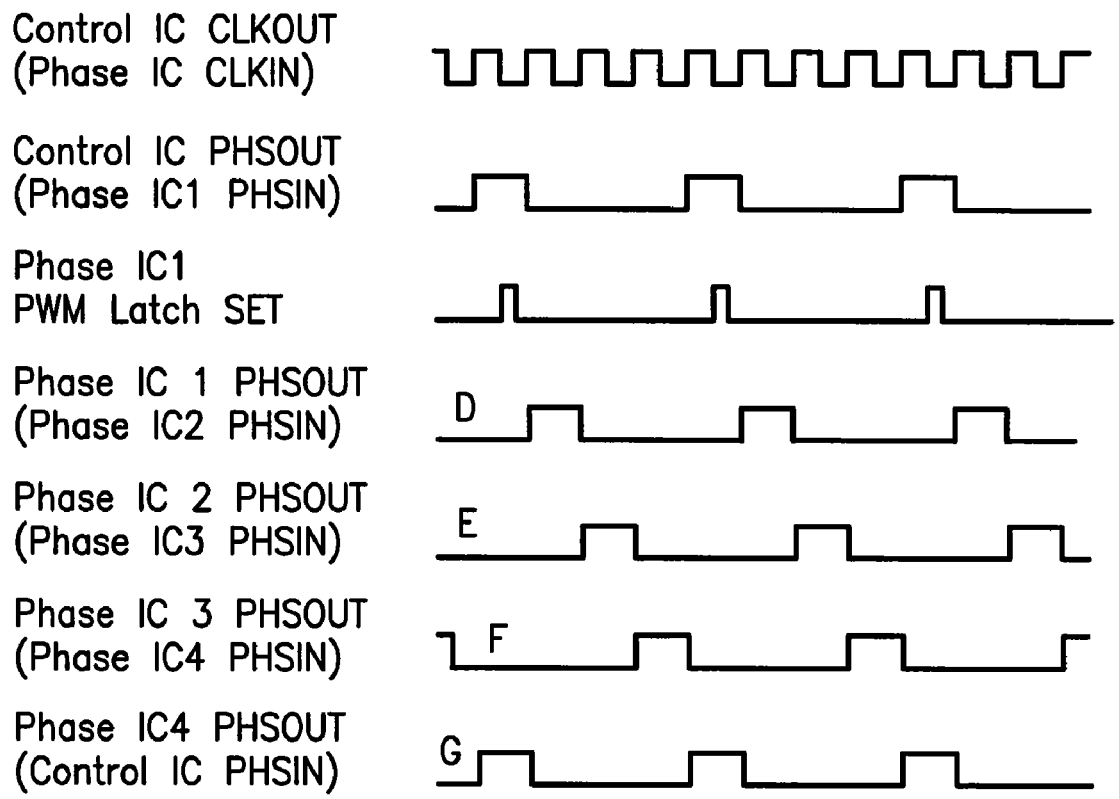
FIG. 3 shows waveforms in FIG. 2 for four phases.

In the multi-phase converter, each control switch Q1 is turned on to provide output current to charge the output inductor to provide current to the load at a time determined by a clock pulse which may be provided by the control IC. The clock pulses for each phase IC (labeled PHSIN) are shown in FIG. 3. As shown, there is a time delay between the PHSIN signals (IC1 PHSIN, IC2 PHSIN, IC3 PHSIN, IC4 PHSIN so that the respective phase control switches Q1 are turned on out of phase from each other. The turn-on of the synchronous switches Q2 are likewise delayed, but turn on in complementary manner to the control switches.

Figure 4:
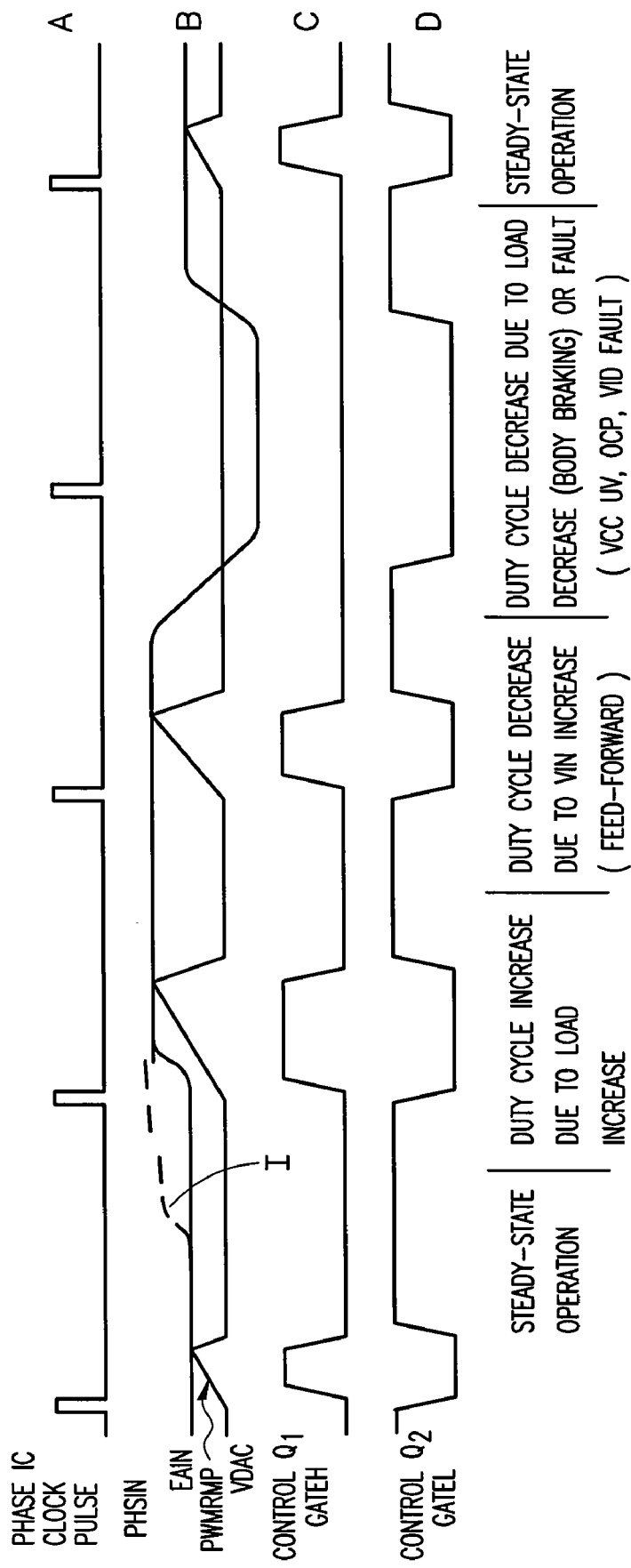
FIG. 4 shows waveforms in FIG. 2.

With reference to FIG. 2 which shows in greater detail the circuit of FIG. 1, although showing only two phase ICs 30, a clock pulse is provided at CLKOUT from the clock circuit 15 of control IC 10. As shown in FIG. 4, at A, and with reference to FIG. 2, when a clock pulse occurs, this starts a ramp signal PWMRMP, which is shown at the non-inverting input of the PWM comparator 45 in FIG. 2. It also turns on the control switch Q1. See C of FIG. 4. PWMRMP is shown in waveform B of FIG. 4. The base level for the PWM ramp is a signal $VDAC^1$ which is provided by the control IC 10 based on a reference voltage level set by VID signals VID0 to VID7. See FIG. 1. When PWMRMP equals the output of an error amplifier 20 in the control IC 10, which compares feedback FB from the output voltage of the converter against the reference voltage VDAC, as shown in FIG. 2, the control or high side switch Q1 is turned off and the low or synchronous switch Q2 is turned on. See waveforms C and D of FIG. 4. As shown, the control or high side switch Q1 is turned on when the clock pulse occurs and turned off when the ramp voltage equals the error amplifier output. This is shown for a range of error amplifier signals in FIG. 4B. As shown, when the error amplifier output increases due to a load step-up as shown at I in FIG. 4B, the control switch Q1 is turned on when the clock pulse occurs and is turned off when the PWM ramp voltage has reached the error amplifier output EAIN. A shown in FIG. 4, the increased error amplifier output results in increased Q1 duty cycle. The duty cycle accordingly follows the error amplifier signal and once the error amplifier signal decreases due to for example, a load decrease, the duty cycle is reduced, as shown in FIG. 4C.

Although FIGS. 1 and 2 show a separate control integrated circuit 10 and phase integrated circuits 30, the circuit can use a single integrated circuit or discrete circuitry or any number of ICs, e.g., all phases in one IC, for example.

As shown in FIGS. 1 and 2, the control IC 10 provides a clock signal CLKOUT, as shown in FIG. 3, to each of the phase ICs at the respective input CLKIN. Dotted lines 15 in FIG. 2 show that additional phases or phase ICs can be employed depending upon the load requirements in which case the signal lines 16 would extend to the additional phase ICs.

The invention utilizes two lines from the control IC 10, CLKOUT (A) and PHASE OUT (B) (PHSOUT) and a return line PHASEIN (C) plus ground via a daisy-chain arrangement of the control ICs 30 to set the frequency of operation and phase timing of the phase ICs 30.

As shown in FIGS. 1, 2 and 3, slave clock signal CLKOUT (A) is provided to each phase IC 30 as CLKIN. In addition, a lower frequency signal master clock PHSOUT (B) is provided to the first phase IC as PHSIN which is the clock signal which sets the PWM frequency of the phase IC. The first phase IC provides a signal PHSOUT (D) which is provided to the input of the next phase IC to provide a delayed clock signal PHSIN to that phase IC. This is shown in greater detail in FIG. 1 for a six-phase converter. Each phase IC 30 provides a delayed phase timing signal to the next phase IC in a daisy-chain arrangement. The last phase IC provides a PHSOUT signal (E in FIG. 2) back to the control IC 10. In the six converter arrangement of FIG. 1, this is indicated by line C. Note that in each successive converter, the signals (D, E, F, G, H and C) are delayed by one clock period of CLKIN from the immediately preceding converter by a flip-flop FF (see FIG. 2). FIG. 3 shows the successively delayed signals (D, E, F and G) for a four phase converter.

The sequentially out of phase clock signals PHSIN to each phase IC are provided to each of the phase ICs to control the respective on times of the control and synchronous switches of each of the respective buck converters. FIG. 3 shows the sequentially delayed clock signals PHSIN for each of four phase ICs, phase IC1 through phase IC4. As can be seen in FIG. 3, each of the clock signals PHSIN for each phase IC is delayed sequentially to provide the out of phase timing control for turning on the respective switches Q1 and Q2 of each phase.

FIG. 4, as already described, shows the phase IC clock pulse PHSIN for a single phase and exemplary PWM ramp and error amplifier EAIN signals and the gate output signals for the control and synchronous (SYNC) switches.

In order to provide the two signals from the control IC 10, two oscillators in the clock circuit 15 are provided in the control IC in a master-slave arrangement. This is shown in detail in FIG. 7. The master oscillator 150 operates at the switching frequency of the converters, that is the switching frequency of the PHSIN signals. A slave oscillator 152 oscillates at a frequency X times the master frequency, where X is the number of phases. Accordingly, the clock frequency CLK is set as the slave frequency, X times the master frequency, which is determined by the number of phase ICs. This is automatically determined by the control IC based on the time delay, equal to a predetermined number of clock pulses delay caused by the cumulative delays in each phase IC. This is accomplished by sending out a pulse train on PHSOUT (B) and determining the phase delay at PHSIN (C). See FIGS. 1 and 2.

Figure 7:
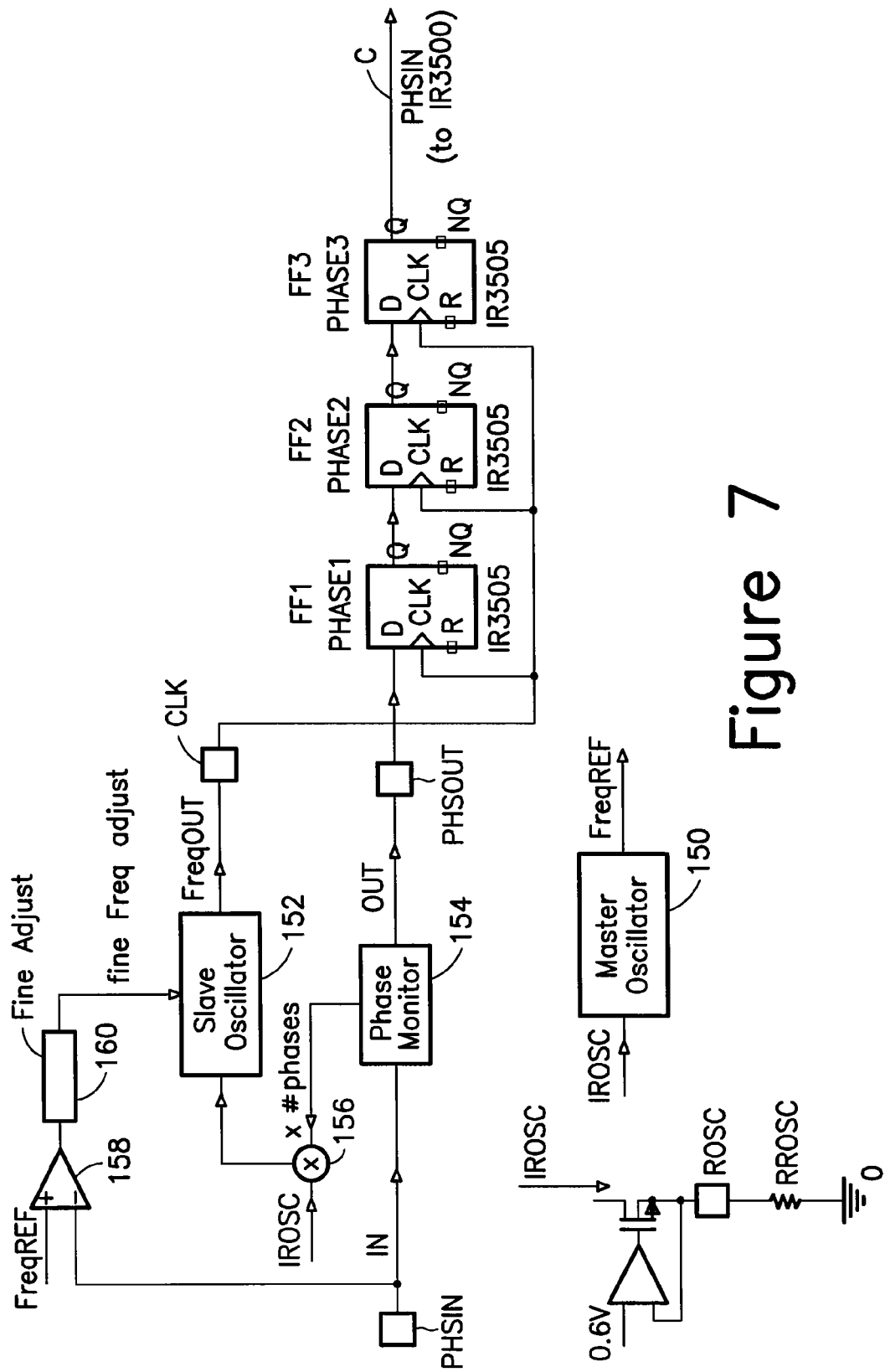
FIG. 7 shows the main control circuit and in particular, the clock circuit.

With reference to FIG. 7, the delay circuits FF1 to FF3 (for a three phase converter) in each phase controller 30 are illustrated in the daisy chain arrangement. Each FF receives the high frequency slave, clock signal CLK. FF1 receives the lower frequency signal PHSOUT at its D input, which is clocked in FF1 by CLK to FF2 and then to FF3, etc., as previously described.

PHSOUT is developed as follows. Master oscillator 150 produces FreqREF from an oscillator current source IROSC, determined by RROSC. Current IROSC is provided to a multiplier stage 156. A phase monitor 154 monitors PHSIN (c) from the last phase controller FF to determine the number of phases X. Multiplier 156 multiplies the number of phases X by Current IROSC, which is input to the slave oscillator 152 to determine the slave oscillator frequency FreqOUT, which is provided as the high frequency clock signal CLK. FreqREF is used to provide a fine frequency adjustment of CLK via comparator 158 and fine adjustment stage 160. Accordingly, the oscillator 152 is slaved to the master 150.

Figure 8:
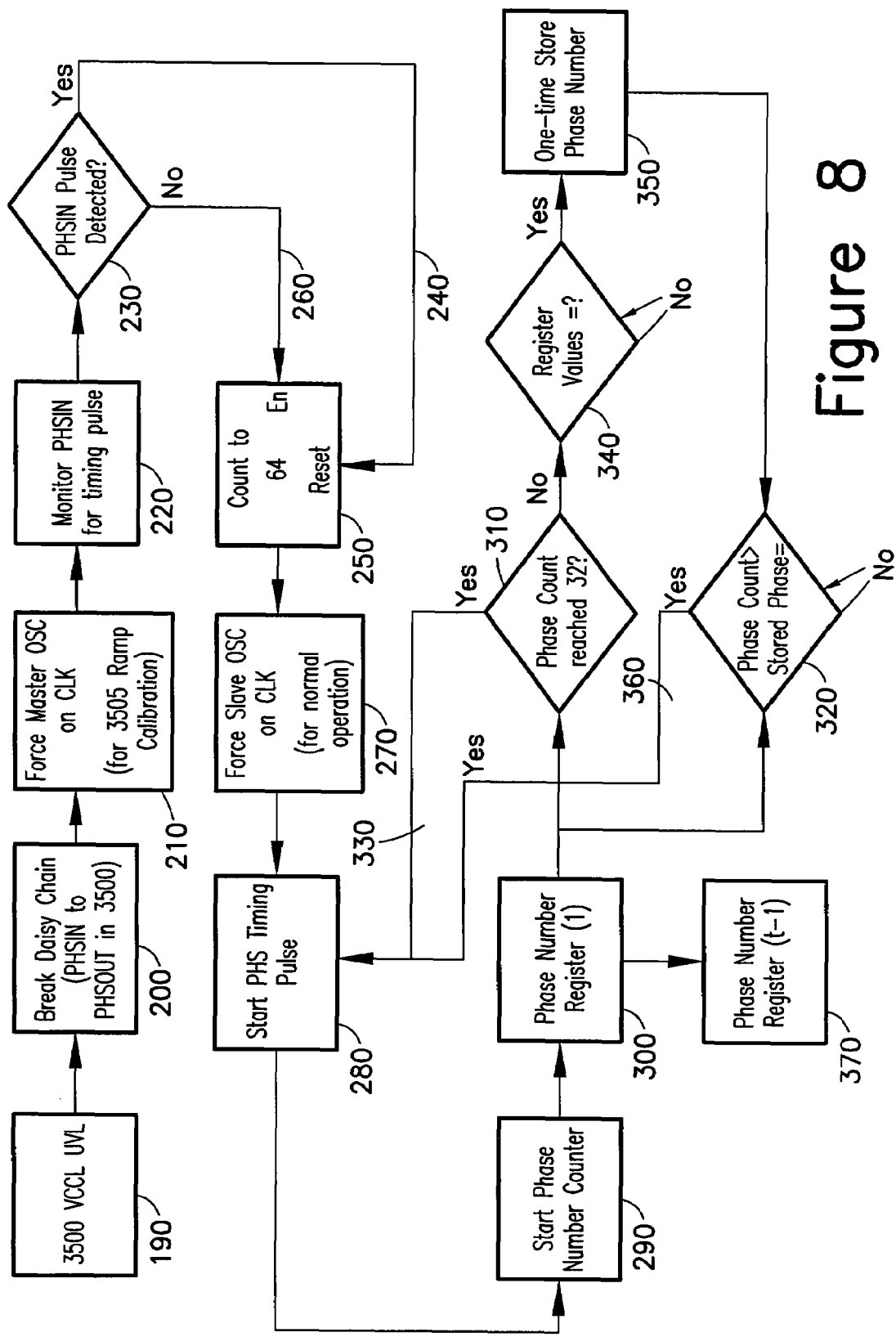
FIG. 8 shows the main control circuit at power up phase start.

FIG. 8 shows how the number of phases are determined. The number of phases is determined at power-up. First, on power up, when under voltage UVL is high (190), the daisy chain is interrupted (200). The master oscillator 150 is forced on the clock (210) for ramp calibration. Then PHSIN is monitored for a timing pulse (220, 230). If the pulse is detected, a counter is reset (240,250). If the pulse is not detected, the counter is enabled (260,250). The slave oscillator is forced on the clock (270). The PHS timing pulse is then generated (280). A phase number counter 250 is started at 290 and the phase number register (t), (t−1) (300,301) is monitored (310, 320) for the phase count. If the phase count is 32, the timing is restarted (330). If not, the register values are checked for equality (340). If yes, the phase number X is stored (350), and checked at 320 to determine if the phase count is greater than the stored phase number. If yes (360), a new phase timing pulse is generated (280). When UVL (under voltage lockout) goes low, the operation in FIG. 8 is discontinued and normal daisy chain operation occurs. At this time, the number of phases X will have been determined and the oscillator 152 will be slaved to the master 150 at X times the frequency of oscillator 150.

A circuit is further employed which determines if the error amplifier voltage is above a reference voltage by a prescribed amount. If the error amplifier output voltage exceeds the reference voltage by the prescribed amount, the gate signal for the control switch is turned on immediately and the gate signal for the synchronous switch is turned off. This can be done for a single phase or, preferably, the control switches for all phases are turned on at the same time thus providing an immediate burst of power to satisfy the load requirements.

Figure 5:
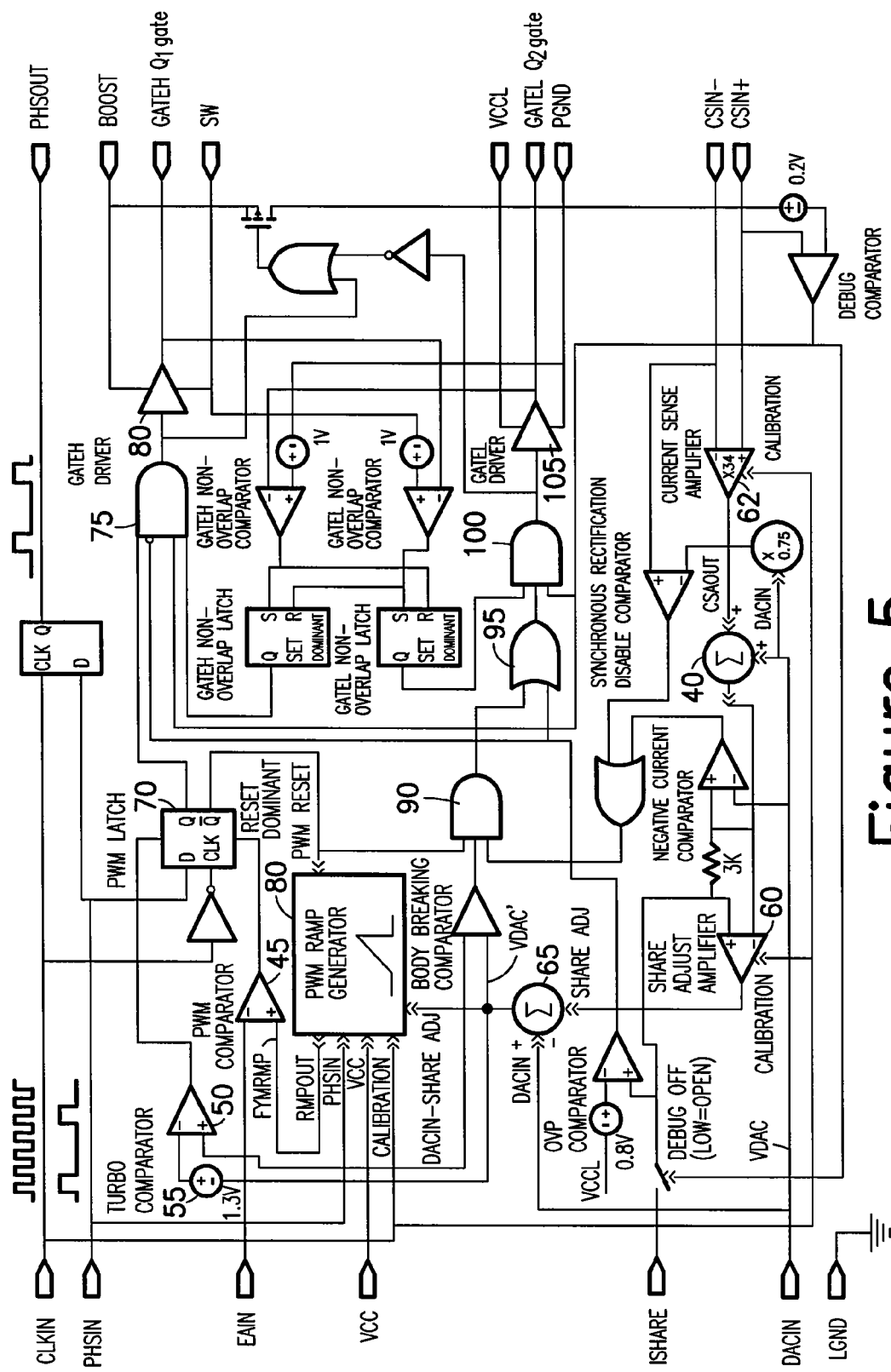
FIG. 5 shows a detailed block diagram of one phase control circuit for controlling a buck converter output stage.
Figure 6:
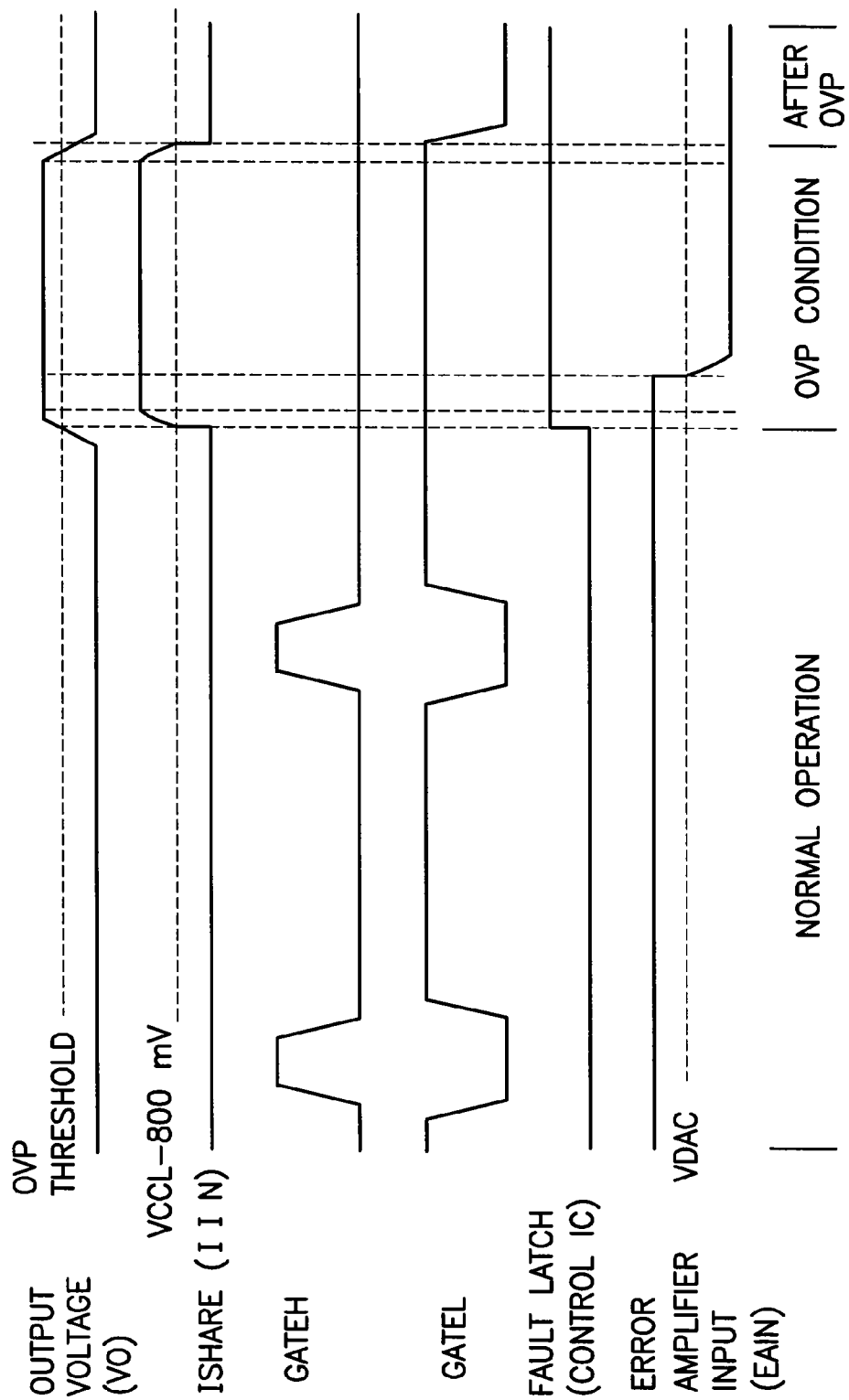
FIG. 6 shows waveforms of the circuit of FIG. 5.

With reference to FIGS. 2, 5 and 6, in normal operation, the output voltage VOUT is monitored by an error amplifier 20. See FIG. 2. The error amplifier 20, shown in the control IC 10, receives a signal FB from the remote sense amplifier 32 which senses the output voltage across terminals VOSENSE+ and VOSENSE− and produce an output $V_O$. This output $V_O$ (FIG. 2) is provided through a voltage divider circuit 35 to the inverting input of the error amplifier 20. The non-inverting input of the error amplifier 20 is provided with a signal VDAC provided at the input VSETPT. This sets the desired converter output voltage. VDAC is itself the output of a digital to analog converter in control chip 10 which receives digital inputs VID0 to VID7 from a microprocessor to set the output voltage. The output of the error amplifier EAOUT represents the deviation of the output voltage from the reference VDAC. This error amplifier signal, shown as EAIN at the input of the phase ICs 30, is compared in each phase IC by a PWM comparator 45 to a ramp voltage PWM RMP which begins as shown in FIG. 4 when the clock pulse PHSIN occurs. When the clock pulse occurs, the PWM latch 70 is set turning on the control switch Q1. The synchronous switch Q2 is turned off slightly before the control switch Q1 is turned on to avoid shoot-through. Once the ramp voltage equals the error amplifier voltage, the PWM comparator 45 output resets the PWM latch 70, turning off the control switch Q1 and turning on the synchronous switch Q2 after a small time delay, again to prevent shoot-through.

FIG. 6 shows the operation of the circuit of FIG. 5 which shows greater details of the circuit of FIG. 2. There is also a current sense amplifier 62 in each phase IC 30 which monitors the current in the output inductor for that phase. The output of the current sense amplifier 62 is summed with the voltage VDAC (DAC IN) in a summing stage 40 and compared to an average current signal ISHARE in a share adjust error amplifier 60. The output of the share adjust error amplifier 60 adjusts the charge rate of a charging capacitor Cc to adjust that phases' share of the total output current. For example, if the current sensed in the particular phase is higher than the average (ISHARE), the PWM ramp generator 80 will adjust the PWM ramp to reduce the current in that phase to bring it closer to the average. This is done in each of the phase ICs so that each phase shares equally in the total current supply to the load.

As shown in FIG. 6, a response of the circuit to an over-voltage in the output voltage (over voltage protection—OVP) is shown whereby when the output voltage exceeds the OVP threshold, a fault latch in the control IC is operated causing the control switch Q1 not to be turned on for the next clock pulse resulting in the error amplifier output EAIN to the phase ICs reducing to reduce the output voltage.

Figure 6A:
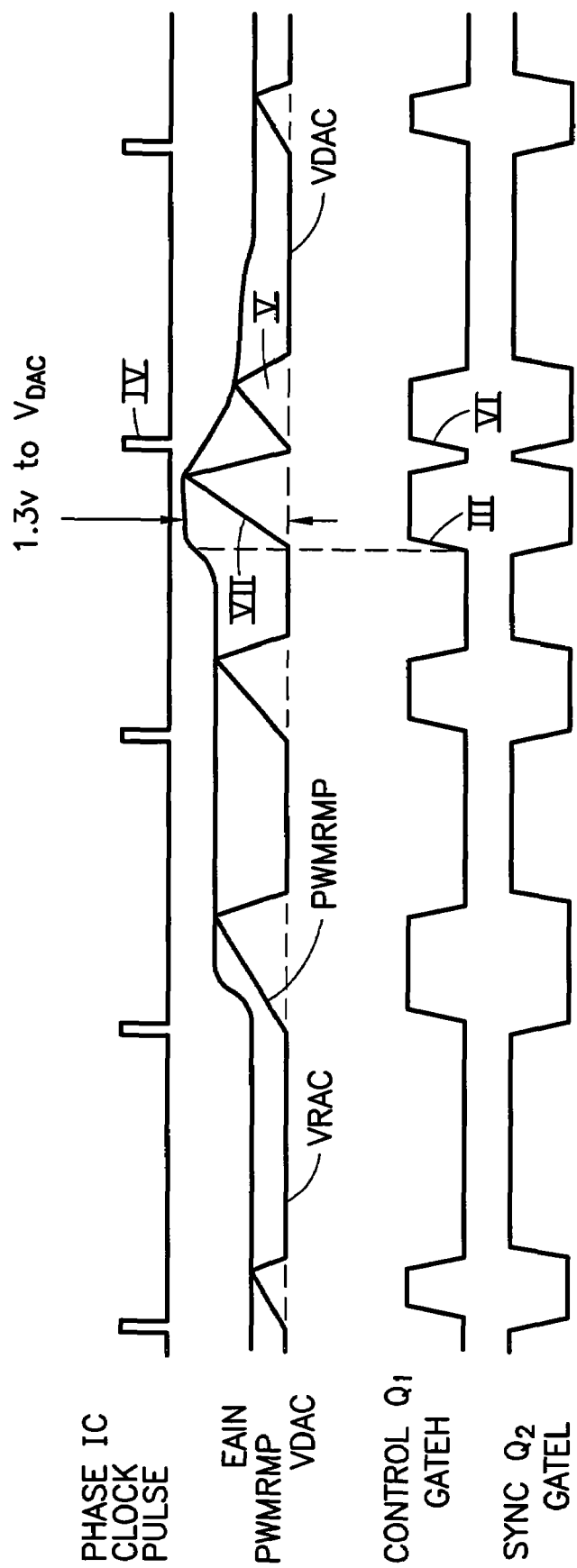
FIG. 6A shows the response to a stepped up load transient.

FIG. 6A shows the response of the circuit to a stepped-up load transient. When a stepped-up load transient occurs, the error amplifier output voltage will increase because the converter output voltage will decrease. If the output voltage EAIN of the error amplifier 20 exceeds a prescribed amount, as shown in FIG. 7, illustratively 1.3 volts above a reference voltage $VDAC^1$, a comparator 50 (having a reference 55 voltage of illustratively 1.3 volts above the voltage $VDAC^1$, which is in turn set by the share adjust amplifier 60, via a summing stage 65) output goes high setting the PWM latch 70. Note that $VDAC^1$ is a modified form of VDAC, as it is adjusted by the output of the share adjust amplifier 60. If the share adjust amplifier 60 is not present then VDAC and $VDAC^1$ are the same. The setting of PWM latch 70 forces the output gate H, which is the gate of the control switch Q1, high via gate 75 and the driver 80. Slightly before this time, the complementary output of the PWM latch 70 resets the PWM ramp generator 80 and via gates 90, 95, 100 and the gate driver 105, turns off the synchronous switch Q2.

This is shown in FIG. 6A where the gate signal to the control switch (gate H) is turned on at III prior to the clock signal pulse at IV. As shown in FIG. 6A, once the clock signal occurs, the PWM ramp begins again, as shown at V, turning on the control switch as shown at VI.

In order to prevent the high side switch Q1 from conducting too long, the PWM ramp slope is increased, e.g., doubled, during this mode of operation. This is shown by the increased slope at VII in FIG. 6A. The phase IC 30 comes out of this mode once the PWM ramp signal rises above the error amplifier output.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A multi-phase converter comprising:
   a plurality of switching circuits each controlled by a phase controller and each providing a switched output voltage to an output node of the converter and wherein each switching circuit under control of the phase controller sequentially provides a switched output voltage to the output node at which an output voltage of the converter is developed; and
   a main control circuit including a clock circuit for providing a first clock signal to each of the switching circuits and a second lower frequency clock signal to a first of the phase controllers, each phase controller having a delay circuit controlled by the first clock signal to provide a delayed second clock signal for coupling to a next one of the phase controllers, and, in the case of a last one of the phase controllers, back to the main control circuit, whereby a plurality of sequentially delayed second clock signals is provided, one to each of the remaining phase controllers after the first phase controller to determine when each switching circuit provides the switched output voltage to the output node.

2. The multi-phase converter of claim 1, wherein the clock circuit comprises two oscillators arranged in a master-slave arrangement, the master oscillating at a switching frequency of each switching circuit corresponding to the second clock signal and the slave oscillating at a frequency X times the master corresponding to the first clock signal, where X is the number of switching circuits.

3. The multi-phase converter of claim 2, further comprising a delay circuit in each phase controller coupled to said first clock signal for delaying the second clock signal and for providing the delayed second clock signal to the next phase controller, and in the case of the last phase controller, back to the main control circuit.

4. The multi-phase converter of claim 3, where the delay circuit comprises a flip flop.

5. The multi-phase converter of claim 3, wherein the delay circuit delays the second clock signal by one cycle of said first clock signal.

6. The multi-phase converter of claim 2, wherein a delayed second clock signal of the last of the phase controllers is coupled back to the main control circuit as a returned second clock signal; further comprising a circuit for detecting the phase delay between said second clock signal and said returned clock signal for determining the number of switching circuits and for setting the frequency of said first clock signal.

7. The multi-phase converter of claim 6, wherein said phase detecting circuit operates at power-up of said converter to determine the number of switching circuits.

8. The multi-phase converter of claim 1 wherein each switching circuit comprises a control switch and a synchronous switch coupled in series across a DC voltage bus with a switched node at a common connection point between the two switches and further comprising a first circuit comparing a first signal proportional to a difference between the output voltage of the converter at the output node with a signal comprising a first reference voltage, with a second signal comprising a ramp signal and for producing a pulse width modulated signal to control the on-times of the switches of the connected switching circuit.

9. The multi-phase converter of claim 8, wherein each switching circuit comprises a buck converter having an output inductor coupling the switched node to the converter output node.

10. The multi-phase converter of claim 1, wherein the phase controllers and the main control circuit are formed as a single integrated circuit.

11. The multi-phase converter of claim 1, wherein the phase controller and the main control circuit are separate integrated circuits.

* * * * *